Oct. 26, 1926.

A. L. POWELL

MECHANICAL MOVEMENT

Original Filed Feb. 15, 1919   7 Sheets-Sheet 2

1,604,604

Inventor

Alvah L. Powell

By Max A. Schmidt

Attorney

Oct. 26, 1926.　　　　　　　　　　　　　　　　　1,604,604
A. L. POWELL
MECHANICAL MOVEMENT
Original Filed Feb. 15, 1919　　7 Sheets-Sheet 5

Inventor
Alvah L. Powell
By Max A. Schmidt
Attorney

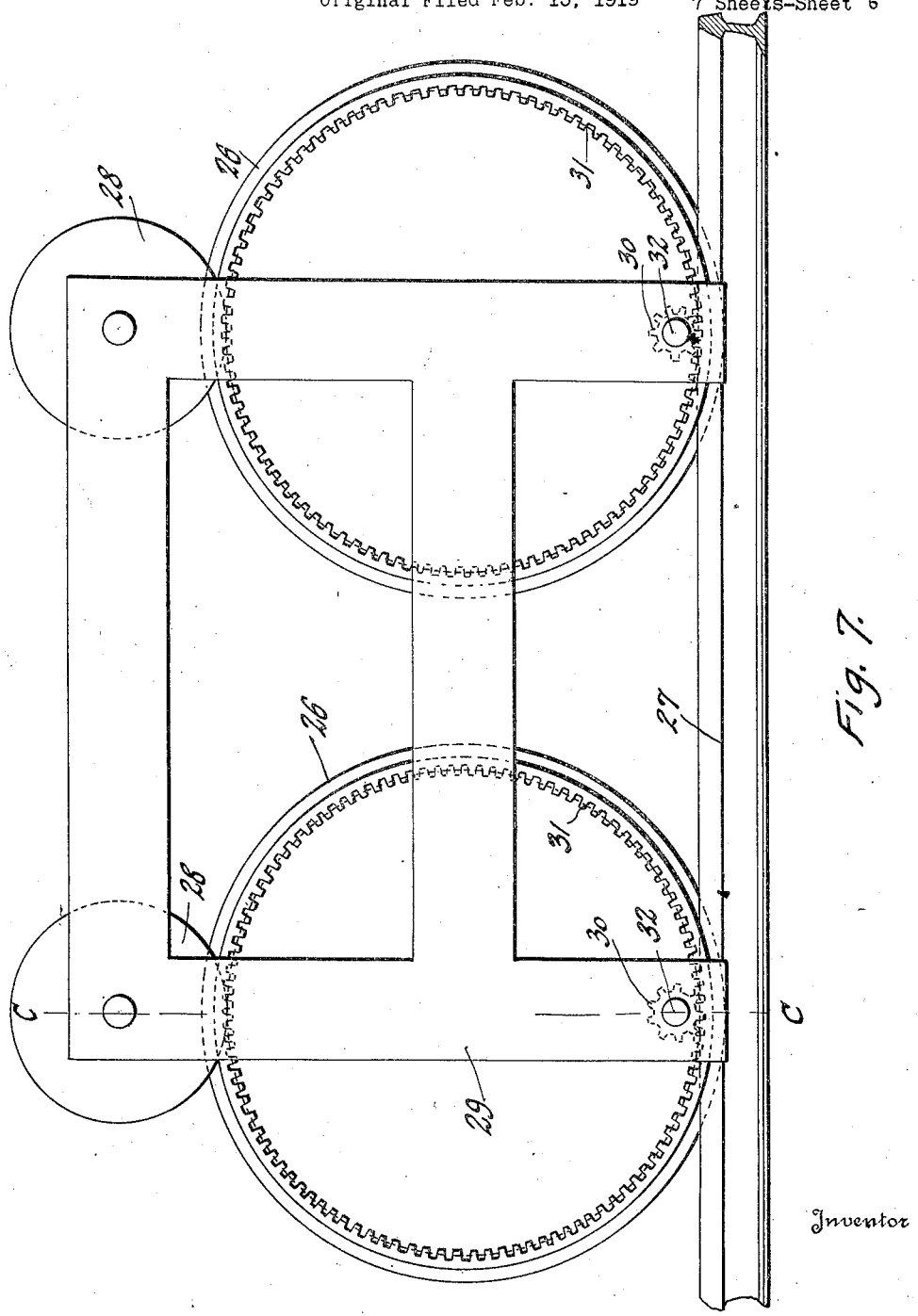

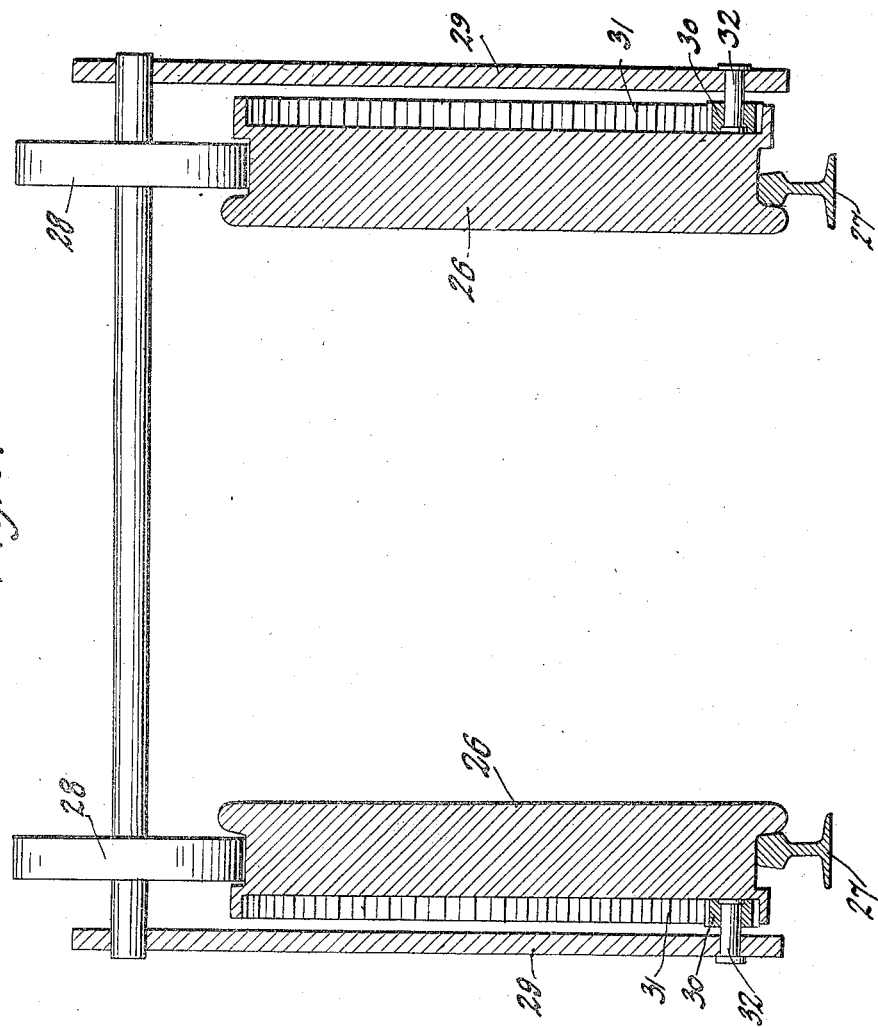

Patented Oct. 26, 1926.

1,604,604

UNITED STATES PATENT OFFICE.

ALVAH L. POWELL, OF MILES CITY, MONTANA, ASSIGNOR, BY MESNE ASSIGNMENTS, TO THE A. L. POWELL POWER COMPANY, INCORPORATED, OF ROUNDUP, MONTANA, A CORPORATION OF MONTANA.

MECHANICAL MOVEMENT.

Application filed February 15, 1919, Serial No. 277,187. Renewed October 13, 1922. Serial No. 594,384.

This invention relates to improvements in the mechanical movements disclosed in my Patent No. 1,217,823 dated February 27, 1917, and in certain features of my applications Serial No. 103,166 filed June 12, 1916, No. 107,308 filed July 3, 1916, No. 118,356 filed September 5, 1916, and No. 142,664 filed January 16, 1917.

The present invention has for its object to transmit, direct and apply initially applied power or driving force through elements which are so associated that the said force is most efficiently used. In some respects the present invention resembles the mechanism disclosed in my application Serial No. 273,100 filed January 25, 1919, with the exception that in the latter case the applied force and the ultimately driven member have a rectilinear reciprocatory motion, whereas in the present case the parts have a rotary motion.

The invention may be exemplified in various forms, and several embodiments will be disclosed, it being understood that many other variations will readily suggest themselves to any one skilled in the mechanical arts.

In order that the invention may be better understood, reference is had to the accompanying drawings forming a part of this specification, and in said drawings, Figure 1 is an elevation of one form of the invention, partly in section, the section being taken on the line A—A of Figure 2;

Figure 7 is an elevation showing still another application of the invention, and Figure 8 is a cross section on the line C—C of Figure 7.

In the various forms of the mechanism illustrated, the showing is largely diagrammatic, and various modifications of such structural details as are shown may be made without a departure from the spirit and scope of the invention, as claimed hereinafter.

Figure 1:
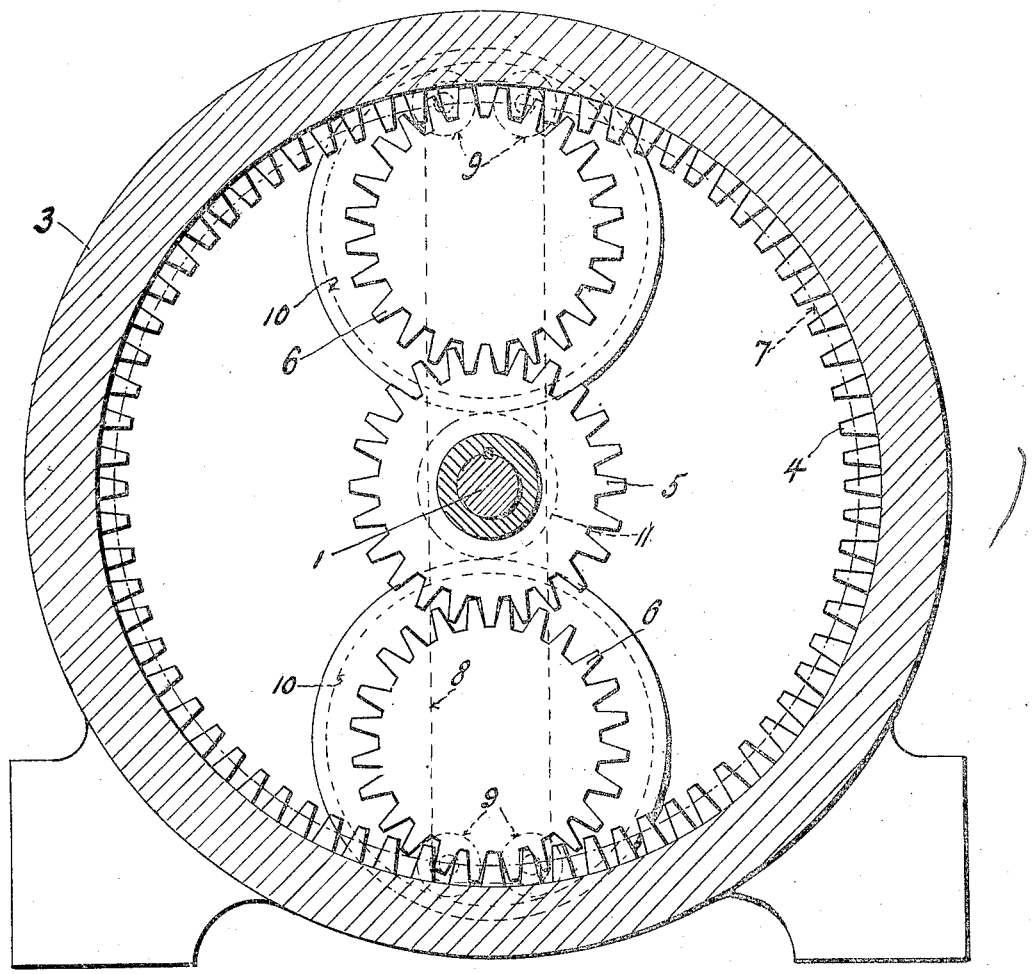
Figure 2:
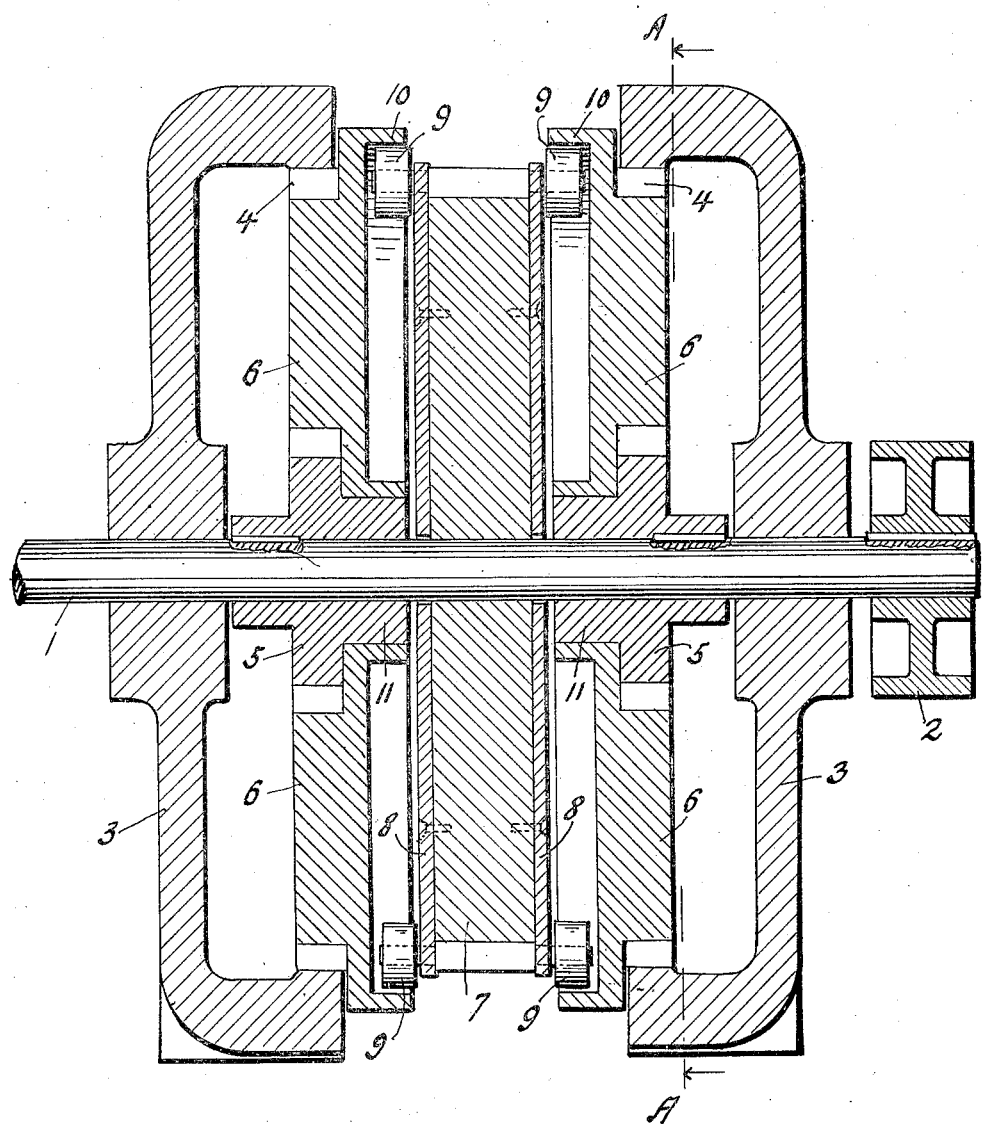
Figure 2 is a central longitudinal section.

Referring specifically to the drawings, and more particularly to Figures 1 and 2, 1 denotes a drive shaft obtaining motion from any suitable source. Figure 2 shows the shaft to be belt-driven through a pulley 2 thereon, but it will be understood that any other operating mechanism may be provided. The shaft is supported in a structure composed of two laterally spaced sections 3. Each of these sections is formed with an internal gear 4 the pitch circle thereof having for its center the center of the shaft 1.

Inside of each gear 4, the shaft 1 carries a pair of pinions 5, these pinions being made fast on the shaft in any suitable manner to turn therewith.

Between each pinion 5 and the corresponding gear 4, and meshing therewith, are located two diametrically opposite pinions 6. These pinions 6 are not fixed to a shaft or other axial support, but they are free to move bodily in a circular orbit, and as they are in mesh with the gears 5, they also rotate. It will therefore be seen that the pinions are given a planetary motion when the drive pinions 5 are turning. The travel of the pinions 6 in a circular orbit is utilized to impart a rotary motion to a driven member 7 which is rotatively supported on the shaft 1 between the drive pinions 5. This driven member may be a spur gear, pulley, friction wheel or other element by which its motion may be transmitted or applied as desired. The drawing shows a spur gear. The following means are provided for transmitting motion to the driven member 7 from the pinions 6:

On the faces of the member 7 are secured plates 8 which are arranged diametrically with relation to the orbit gear and have central apertures to clear the shaft 1, as shown in Figure 2. The outer ends of these plates carry diametrically opposite sets of rollers 9. The drawing shows two rollers in each set, but their number is immaterial, and a single roller may be used. These rollers are positioned to seat on a circular track 10 on the pinions 6, one set of rollers engaging the track of one of these pinions, and the other set of rollers engaging the track of the diametrically opposite pinion. The tracks 10 may be formed integral with the pinion 6 as shown in Figure 2; or the parts may be made separately and then rigidly connected in any suitable manner. The diameter of the track 10 is greater than that of the pinion 6, proper, and the outer circumference or periphery of the track seats loosely on a hub extension 11 of the pinion, whereas the side of that portion of the pinion 6 which is outside its teeth fits one face of the pinion 5, whereby the pinion 6 is guided in its orbital movement and prevented from being displaced laterally. The track 10 is shown as being formed by an outstanding flange on one side of the pinion 6, this flange being located outside the teeth of said pinion.

It will be noted that the pitch circles of the pinions 6 and the pitch circle of the driven gear 7 will always possess certain points which are coincident, and the centers of the rollers 9 are situated in alinement therewith.

In operation, assuming the shaft 1 to be turning the driving members 5 in a counter-clockwise direction, the pinions 6 will be rotated in the opposite direction, and they will also revolve or roll around the driving members. The revolution of the pinions 6 around the pinions 5 rotates the driven member 7, the latter making one complete turn with every revolution of the pinions 6. The pinions 6 operate similar to a lever, the fulcrum being the annular rack 4 on which they roll, and as the power is taken off the lever (through the rollers 9) practically at this point by reason of the fact that the rollers are carried in the pitch circle of the rack and of the pinions 6, and the power is applied at a diametrically opposite point in the pitch circle of the pinions 6, a maximum leverage effect is obtained, the length of the lever arm being substantially the diameter of the pinions 6. Assuming the diameter of the pinions 5 and 6 to be two inches, and the diameter of the gear 4 to be six inches, the pinions 6 make one complete swing around the drive pinion 5, and the driven member 7 makes one complete turn to every four revolutions of the drive shaft 1. The gear ratio is therefore 3 to 1, but the leverage gain is greater than that resulting from an ordinary system of gearing having this or any other suitable ratio, due to the fact that the lever pinions 6 have no fixed axis, about which they rotate. Obviously, the power applied to an ordinary gear having a fixed axis about which it rotates is not augmented in view of the equal distances from the axis to the point of application of the power and the point at which the power is taken off. The action is the same as a lever having its weight and power arms of equal length. However, with the present structure, the leverage gain is proportionate to practically the entire diameter of the pinion 6, and this is more than the leverage gain due to a difference in the travel of an initially applied driving force above that of the ultimately driven member in a lever or gear mechanism of ordinary design. Considering the pinions 6 as levers, it will be obvious that both ends move substantially the same distance, in the same time, without reference to the location of the fulcrum.

Figure 3:
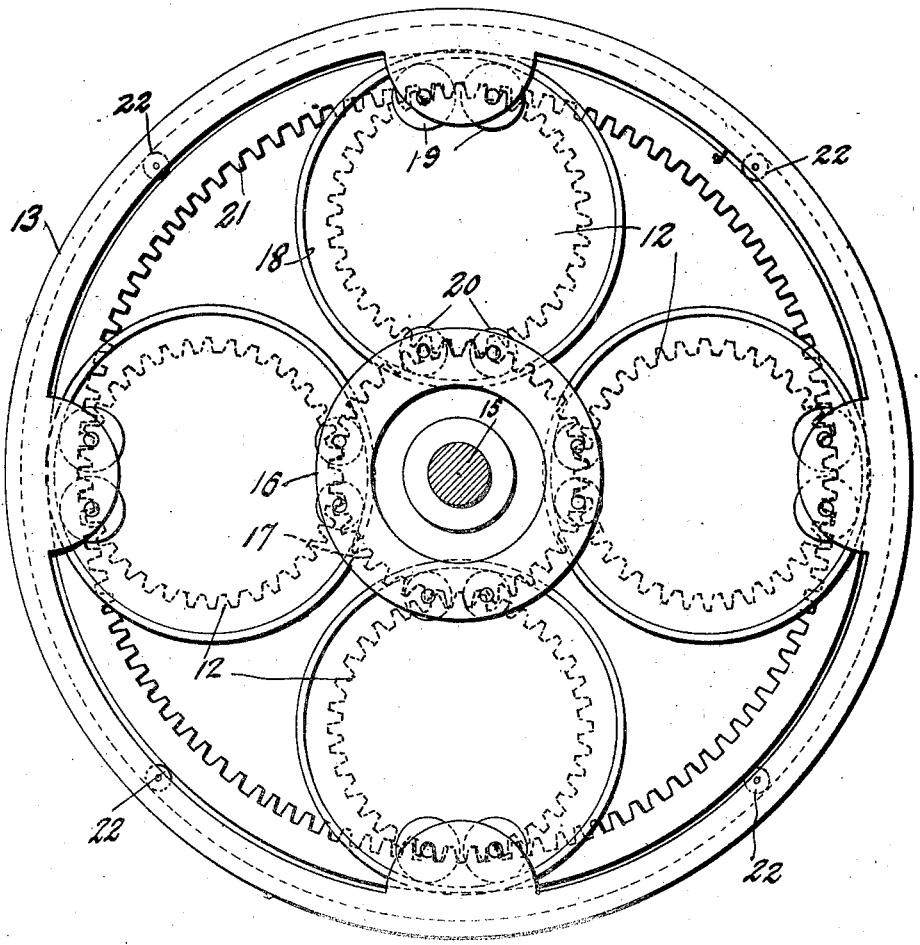
Figure 3 is an elevation showing a different form of the mechanism.
Figure 4:
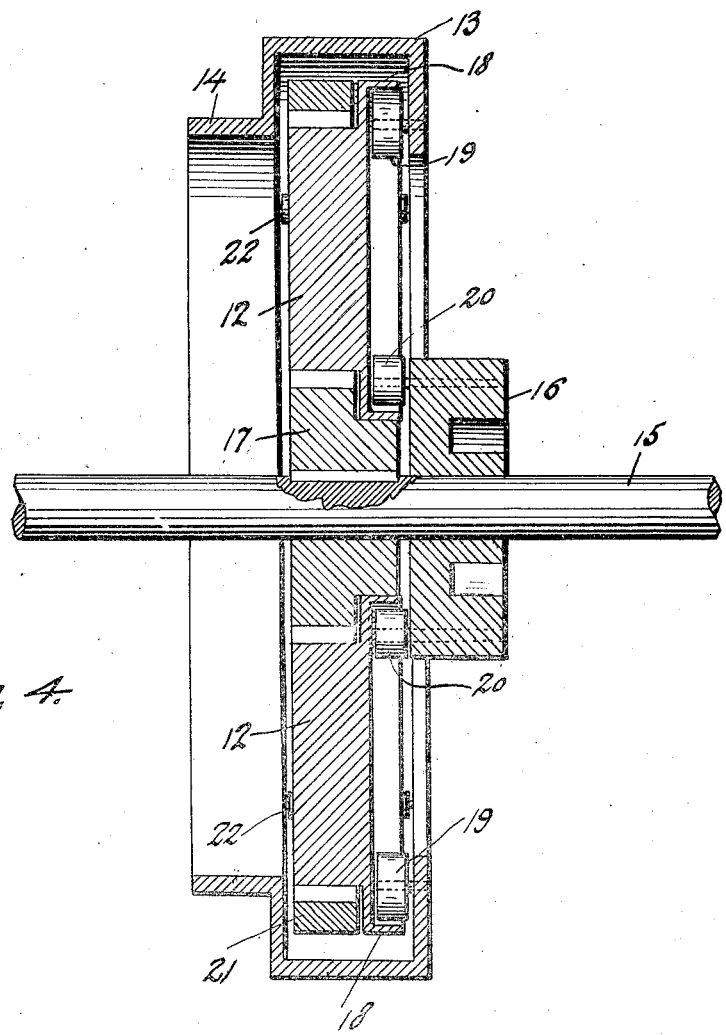
Figure 4 is a longitudinal section thereof.

In the embodiment of the invention shown in Figures 3 and 4, four rolling lever members 12 are shown, the same being carried by an annular driving member 13 which may be belt-driven, it being provided with a rim extension 14 on one side for the belt. The driving member may also be driven by a friction or other form of gearing.

Arranged centrally with respect to the member 13 is a stationary shaft 15 supported in any suitable manner not material to the invention. On this shaft is loosely mounted a driven member shown at 16 in Figure 4. This member may be a pulley, gear or other suitable element for receiving and transmitting rotary motion.

On the shaft 15 is made fast, by a key or other suitable means, a fulcrum member 17 having the same function as the member 4 hereinbefore described. This fulcrum member is shown as a pinion with which the lever pinion members 12 are in mesh, the latter having an annular track 18 as before for engagement by a set of rollers 19 carried by the driving member 13, and a diametrically opposite set of rollers 20 carried by the driven member 16.

Inside the driving member 13, concentric therewith, is positioned an internal gear ring 21 with which the pinions 12 are in mesh. Between the parts 13 and 21 are interposed anti-friction rollers 22 which properly center the same.

In operation, power applied to the member 13 is transmitted to the member 16 through the pinions 12 and the rollers 19 and 20. The pinions 12 roll around the pinion 17, whereby the member 16 is rotated.

It will be noted that the axes of rollers 19 and 20 are positioned at points coincident with points on the pitch circles of the gear members, and the part 14 to which the power is applied coincides with the pitch circle of the gear ring 21, so that the maximum leverage is again obtained.

Figure 5:
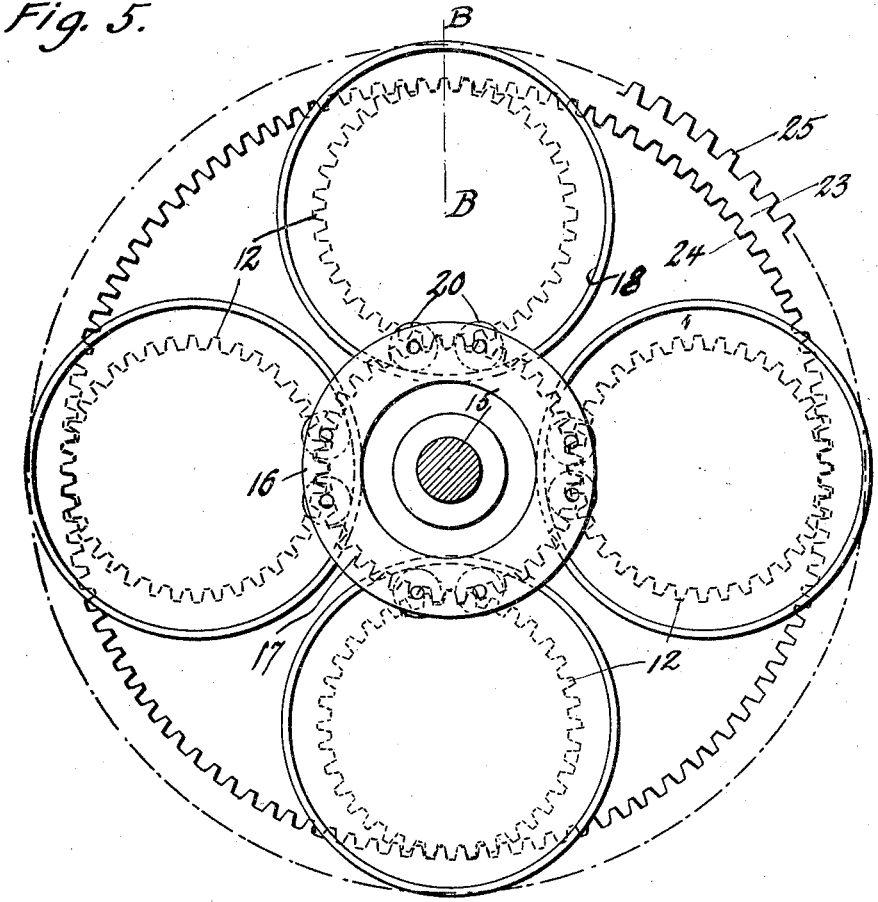
Figure 5 is an elevation showing another embodiment of the invention.
Figure 6:
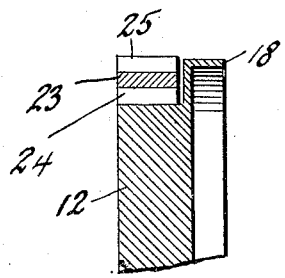
Figure 6 is a section on the line B—B of Figure 5.

The mechanism shown in Figures 5 and 6 does not differ from that shown in Figures 3 and 4, except that the parts 13, 14 and 21 have been combined into a single driving member 23 having internal gear teeth 24 on which the pinions 12 roll, and external gear teeth 25 for application of the driving means or power. It will be understood, of course, that a friction or other type of operating means may, with equal facility, be employed. The pinions 12 are driven directly by the rotating member 23 they being in mesh with the teeth 24 thereof, and the rollers 19 being therefore dispensed with.

Figures 7 and 8 illustrate the mechanism as applied to a locomotive, 26 being the drive wheels thereof running on the track rails 27. These wheels obtain motion from friction wheels 28 or any other suitable power applied to the periphery thereof instead of at the center as is the usual practice. A frame carrying the driving means and the other parts of the machine is shown at 29. This frame carries pinions 30 which are in mesh with annular internal racks 31 on the wheels 26, said pinions turning freely on shafts 32 supported by the frame 29. The rack 31 is so located that the top of the rails 27 are tangent to its pitch circle, and hence the entire weight is borne by the pinions 30 practically at the rails. The driving force, through the members 28, is applied to the wheels 26 at a point diametrically opposite the point engaged by the pinions 30, and also on the pitch circle of the racks 31, and hence the maximum leverage is again obtained.

I claim:

1. Means for advantageously and efficiently utilizing the rotational movement of a driving member to operate a driven member, comprising an arrangement of elements including planetating members, an orbit member, a sun gear, and a planet carrier, the latter being the driven member, the combination therewith of an element for operatively connecting a planet to the carrier, the axis of which element is approximately coincident with the pitch circle of the gear constituting the above referred to orbit member.

2. In motion transmitting mechanism of the type described utilizing members having planetary movements with reference to an orbit gear, an element arranged to be actuated rotatively by said members in the most efficient manner, the operative connection between said element and the members, comprising rotatable bodies whose axes are spaced from the axes of the members.

3. In planetary gearing, a driving sun gear, planet pinions meshing therewith, a fixed orbit gear, and a planet carrier constituting the driven member, each planet pinion being operatively associated with the carrier by means of elements having their points of support on the carrier located at approximately the same distance from the axis of the sun gear as is the pitch circle of the planet.

4. An arrangement of elements for transmitting rotary motion including a planet gear, a planet carrier, and a member associating said gear and said carrier having its axis extending through the pitch circle of said gear.

5. In a planetary gearing of the type wherein a fixed orbit gear, a driving sun gear and a driven planet carrier are employed, the combination therewith of means for operatively associating the planet pinions with the planet carrier in such a manner that the axes of said means is in alignment with points on the pitch circles of the planet pinions.

6. In motion transmitting mechanism, two opposed internally toothed orbit gears, two driving sun gears fixed to a shaft and having their toothed portions lying within the planes of said orbit gears respectively, a planet carrier rotatively mounted on said shaft between said sun gears, plates secured to said planet carrier and diametrically arranged with relation thereto, and rotatable means for operatively associating the planet pinions with said plates and planet carrier, the axes of said rotating means passing through points on the pitch circle of said orbit gears and said planet pinions.

In testimony whereof I affix my signature.

ALVAH L. POWELL.